United States Patent [19]

Ohyama et al.

[11] Patent Number: 5,247,330
[45] Date of Patent: Sep. 21, 1993

[54] IMAGE INPUT DEVICE

[75] Inventors: Atsushi Ohyama; Koichi Tanno, both of Kawasaki, Japan

[73] Assignee: Canon Kabushiki Kaisha, Tokyo, Japan

[21] Appl. No.: 738,154

[22] Filed: Jul. 30, 1991

[30] Foreign Application Priority Data

Aug. 2, 1990 [JP] Japan .................................. 2-206137
Sep. 7, 1990 [JP] Japan ............................. 2-94423[U]

[51] Int. Cl.⁵ ...................... G03B 27/32; G03B 27/52
[52] U.S. Cl. ....................................... 355/64; 355/21; 355/39; 355/70; 355/75
[58] Field of Search ...................... 355/21, 64, 67, 70, 355/75, 39

[56] References Cited

U.S. PATENT DOCUMENTS

| | | | |
|---|---|---|---|
| 2,235,355 | 3/1941 | Brown, Jr. | 355/39 |
| 2,629,813 | 2/1953 | Murphy | 355/70 |
| 3,147,665 | 9/1964 | Anderson | 355/64 X |

*Primary Examiner*—Richard A. Wintercorn
*Attorney, Agent, or Firm*—Robin, Blecker, Daley & Driscoll

[57] ABSTRACT

An image input device including an original pedestal for placing an original to be imaged, a camera unit for taking an image of the original, a camera supporting unit for supporting the camera unit at a predetermined position relative to the original pedestal, a light source for illuminating the original and a light source supporting unit for supporting the light source movable between a first position where the light source is used as a reflection illumination light source and a second position where the light source is used as a transmission light source. In addition, an image input device including an original pedestal for an original to be imaged, a camera unit for taking an image of the original, a support unit for supporting the camera unit at a predetermined position relative to the original pedestal and a housing unit for detachably housing a transmission illumination unit in the original pedestal.

18 Claims, 5 Drawing Sheets

IMAGE INPUT DEVICE

BACKGROUND OF THE INVENTION

1. Field of the Invention

The present invention relates to an image input device, and more particularly to transmission illumination necessary for inputting an image of a transmission original.

2. Related Background Art

In the following specification, an image input device will be described taking as an example a so-called electronic over-head projector, conventionally known in the art, capable of reproducing an image of an original placed on an original pedestal and taken with a video camera to display it on a monitor, or project it on a screen using a projector.

A conventional image input device is constituted by, as shown in FIG. 10, an original pedestal 51 on which an original is placed, a camera 53 having a photoelectric conversion unit for reading an original, and a support frame 54 for supporting the camera 53.

For taking an image of a transmission original such as a negative film, positive film or the like, an image input device requires transmission illumination for illuminating a transmission original from the back thereof.

In view of this, in the image input device shown in FIG. 10, there is provided a transmission illumination unit 52 placed on the original pedestal 51 with a power switch 55.

For taking an image of a transmission original such as a negative film, positive film or the like, a power source for the transmission illumination unit is required in addition to a power source for the image input device, resulting in a complicated structure.

Furthermore, since the transmission illumination unit is placed directly on the original pedestal, there is a possibility of forming scratches and stains on the original pedestal. Still further, since the transmission illumination unit is simply placed on the original pedestal without fixing the former to the latter, the transmission illumination unit might shift while taking an image on a film, resulting in poor operability.

SUMMARY OF THE INVENTION

The present invention has been made to solve the above-described conventional problems. It is therefore an object of the present invention to provide an image input device capable of using a single light source both as a reflection illumination light source and as a transmission illumination light source, and being cost effective and having a good handling performance.

In order to achieve the above object, according to an embodiment of the present invention, there is provided an image input device with a light source for illuminating an original pedestal, wherein the light source is adapted to be movable relative to the original pedestal, between a first position where the light source is used as a reflection illumination light source and a second position where the light source is used as a transmission light source.

With such an arrangement, it becomes possible to use a light source for illuminating an original pedestal as a transmission illumination light source, realizing an economical image input device with good handling performance.

It is another object of the present invention to provide an image input device having a good ornamental design and improved handling performance while providing a transmission illumination light source for taking an image of a transmission illumination original.

In order to achieve the above object, according to another embodiment of the present invention, there is provided an original pedestal for an original, a camera unit for taking an image of the original, a support frame for supporting the camera unit at a predetermined position relative to the original pedestal, and a housing for detachably housing a transmission illumination unit in the original pedestal and for allowing a use of the transmission illumination unit in the housed state.

With such an arrangement, the transmission illumination unit does not extend from the surface of the original pedestal but rather is fixed to the original pedestal at the time of taking an image of a transmission original, thereby providing a good ornamental design and easy workability.

The foregoing and other objects, and advantages of the present invention will become apparent from the following description.

DESCRIPTION OF THE PREFERRED EMBODIMENTS

An image input device according to the first embodiment of the present invention will be described with reference to FIGS. 1 to 5.

Figure 1:
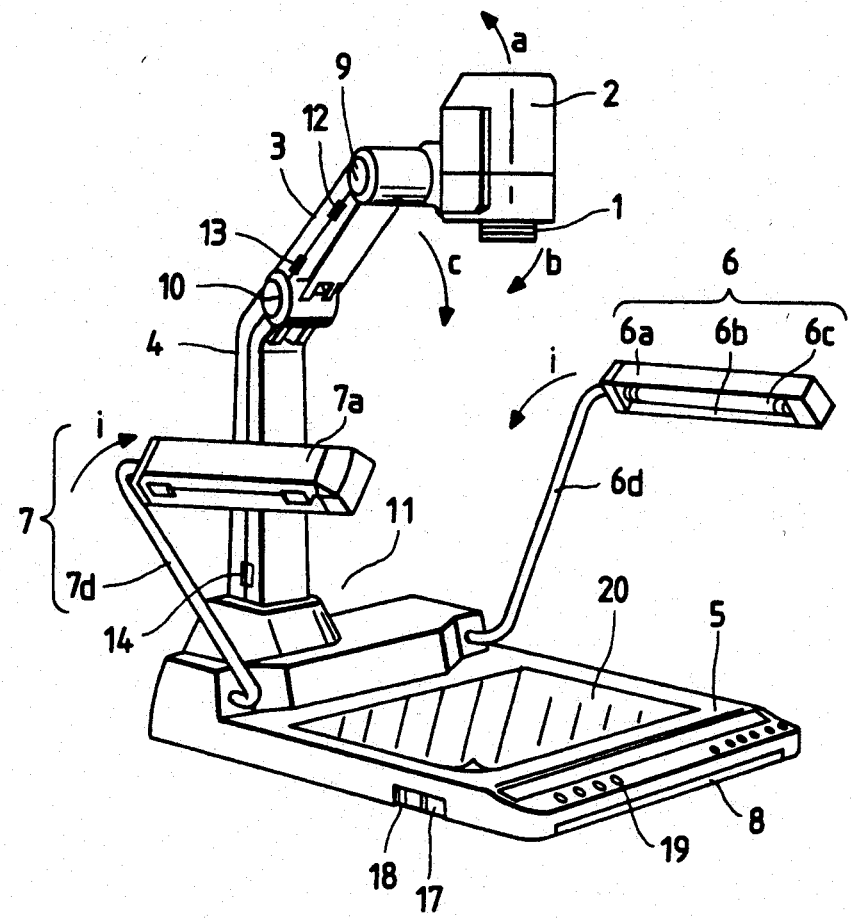
FIG. 1 is a perspective view of an image input device according to a first embodiment of the present invention.
Figure 2:
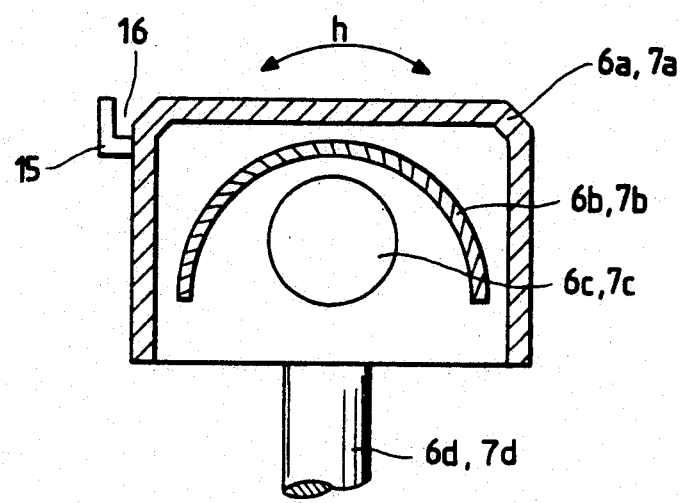
FIG. 2 is a schematic sectional view of a lamp case of the image input device shown in FIG. 1.
Figure 3:
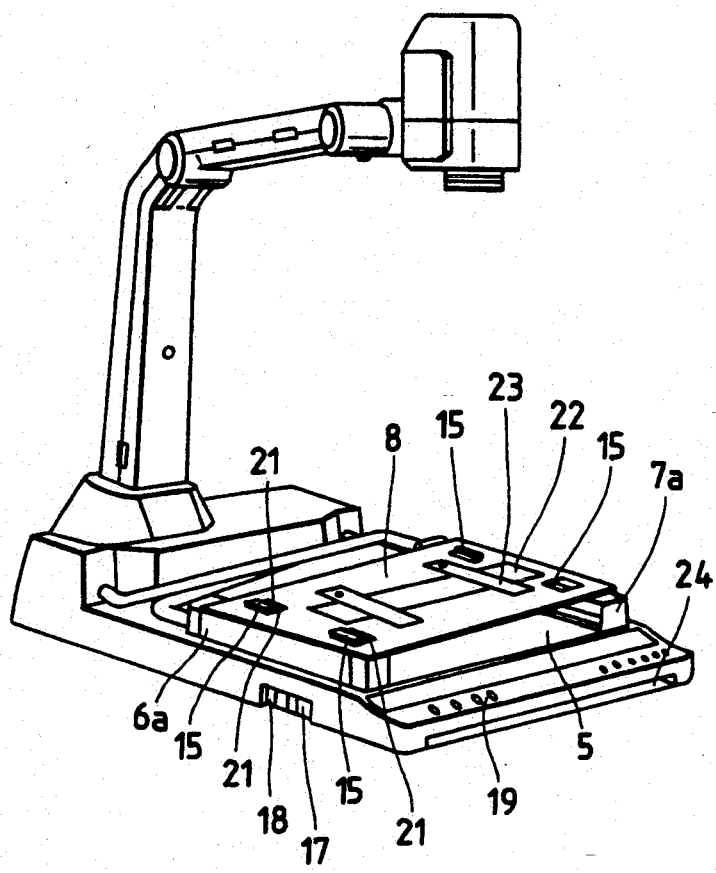
FIG. 3 is a perspective view of the image input device shown in FIG. 1 when taking an image of a transmission original.
Figure 4:
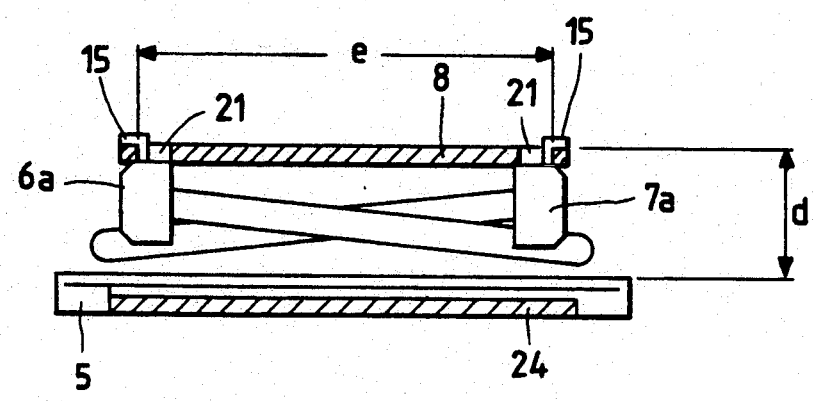
FIG. 4 is a schematic front view of the image input device shown in FIG. 1 when taking an image of a transmission original.
Figure 5:
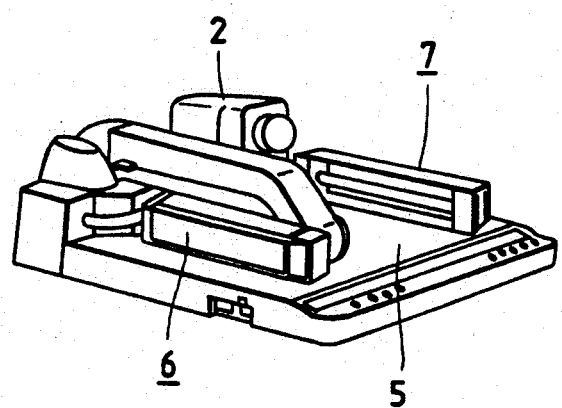
FIG. 5 is a perspective view of the image input device shown in FIG. 1 in a non-use compact state.

FIG. 1 is a perspective view of an image input device according to a first embodiment of the present invention, FIG. 2 is a schematic sectional view of a lamp case of the image input device shown in FIG. 1, FIG. 3 is a perspective view of the image input device shown in FIG. 1 when taking an image of a transmission original, FIG. 4 is a schematic front view of the image input device shown in FIG. 1 when taking an image of a transmission original and FIG. 5 is a perspective view of the image input device shown in FIG. 1 in a non-use compact state.

Referring to FIGS. 1 and 2, reference numeral 1 represents a lens, 2 represents a camera unit, 3 represents an upper frame, and 4 represents a lower frame, 5 represents an original pedestal whose upper surface is achromatic gray. The color of the upper surface of the original pedestal 5 may be white. However, gray having low reflectance is more preferable because the white surface may sometimes cause a saturated light amount received by the photoelectric conversion unit (not shown) of the camera unit 2, resulting in a disability of properly regulating white balance.

The reference numerals 6 and 7 represent an illumination unit, and 8 represents a transmission illumination type original pedestal which uses a mixing plate or the like to transmit light beams uniformly.

The lens 1 is mounted on the camera unit 2 which takes an image on an original placed on the original pedestal 5 and converts light incident to the lens 1 into electric signals. The camera unit 2 and the upper frame 3 are hinged together by an articulation unit 9. The upper frame 3 and lower frame 4 are hinged together by another articulation unit 10, so as to be rotatable by a certain angle range. Similarly, the lower frame 4 and original pedestal 5 are hinged together by an articulation unit 11. In the above manner, the position or posture of the camera unit 2 can be adjusted relative to the original pedestal 5.

The angle of the camera unit 2 can be adjusted relative to the upper frame 3 by operating a button "A" 12. Similarly, the angle of the upper frame 3 can be adjusted relative to the lower frame 4 by operating a button "B" 13. The angle of the lower frame 4 can be adjusted relative to the original pedestal 5 by operating a button "C" 14.

The transmission illumination type original pedestal 8 is adapted to be housed within a housing space 24 formed under the original pedestal 5.

The illumination units 6 and 7 are used for illuminating an original placed on the original pedestal 5. The illumination units 6 and 7, respectively, are constructed of a lamp case 6a, 7a, a reflection plate 6b, 7b, a lamp 6c, 7c, and a support shaft 6d, 7d. The reflection plate 6b, 7b and lamp 6c, 7c are accommodated within the lamp case 6a, 7a, as shown in FIG. 2. Light emanated from the lamp 6c, 7c is directly, or indirectly via the reflection plate 6b, 7b, radiated from the opening of the lamp case 6a, 7a. The lamp case 6a, 7a is pivoted at the distal end of the support shaft 6d, 7d, and rotatable by a certain angle range in the direction indicated by an arrow h in FIG. 2. The lamp case 6a, 7a is provided with a mechanism for stopping it at any desired angle.

The proximal end of the support shaft 6d, 7d is pivoted at the rear end of the original pedestal 5, and rotatable by a certain angle range in the direction indicated by an arrow i in FIG. 1. The support shaft 6d, 7d is provided with a mechanism for stopping it at any desired angle, and can be moved from the position of FIG. 1 to the position of FIG. 3.

A pair of L-character shaped fixing claws 15 are mounted on the lamp case 6a, 7a at one side thereof such that, when the lamp case 6a, 7a is rotated to come near the original pedestal 5, the claw 15 stands upright. The open end 16 of the L-character shaped fixing claw 15 is longer than the thickness of the original pedestal 8 wall, so that the top piece of the L-character shaped fixing claw 15 comes above the top surface of the original pedestal when the lamp case 6a, 7a is at the position shown in FIGS. 3 and 4.

One side of the original pedestal 5 is mounted with a power switch 17 of the image input device, and an illumination switch for the illumination units 6 and 7, and the front upper portion is mounted with an operation panel 19.

Next, the operation of reading an original by using the image input device constructed in this way will be described.

First, for taking an image of a non-transmission original such as a copied original, the power switch 17 is turned on when the image input device takes the position as shown in FIG. 1. Then, a subject 20 or non-transmission original placed on the original pedestal 5 is read by the camera unit 2. The taken image of the subject 20 is displayed on a monitor (not shown) connected to the image input device. If the surface of the original pedestal 5 is dark and the image on the monitor is difficult to ascertain, the illumination switch 18 is turned on to activate the illumination units 6 and 7. The illumination units 6 and 7 at the position shown in FIG. 1 then illuminate the original on the original pedestal 5 to take a clear image.

Next, referring to FIGS. 1, 3 and 4, the operation of taking an image of a transmission original such as a negative film, positive film, or the like will be described in detail.

For taking an image of a negative film or positive film, it is necessary to illuminate the film from the back. In view of this, a transmission illumination unit has been used conventionally in addition to the image input device. According to the present invention, it is not necessary to prepare a transmission illumination unit for taking an image of a negative film or positive film.

Referring to FIG. 1, the button "A" 12 is operated to rotate the camera unit 2 in the direction indicated by arrow a, and the button "B" 13 is operated to rotate the upper frame 3 in the direction indicated by arrow c, to thereby set the camera unit 2 to a close-up position. The illumination units 6 and 7 are rotated to move them down to the original pedestal 5.

Referring to FIG. 3, the transmission, illumination type original pedestal 8, which is housed under the original pedestal 5, is picked up. The transmission illumination type original pedestal 8 is then fixed to the lamp cases 7a and 6a such that a pair of fixing holes 21 formed on one side of the transmission illumination type original pedestal 8 are coupled to the pair of fixing claws 15 mounted on the lamp case 7a of the illumination unit 7, and another pair of fixing holes 21 are coupled to the other pair of fixing claws 15 mounted on the lamp case 6a. Referring to FIG. 4, the illumination units 6 and 7 are folded and fixed together by the fixing holes 21 and fixing claws, with the width between the pairs of fixing holes being set to e and the height between the original pedestal 5 and the transmission illumination type original pedestal 8 being set to d. In this case, the illumination units 6 and 7 are positioned near the original pedestal 5, and not in contact therewith.

Referring again to FIG. 3, the illumination switch 18 of the image input device is turned on to make the lamps 6c and 7c of the illumination units 6 and 7 operate as the illumination light sources. A negative film or positive film whose image is to be picked up is placed on the transmission illumination type original pedestal 8. Using switches mounted on the operation panel 19 in front of the original pedestal 5, the size, white balance, and the like are adjusted. If a reversal image of the negative film is desired, a negative/positive reversal button on the operation panel 19 is operated. A pair of film fixing claws 23 we are mounted on the transmission illumination type original pedestal 8 so that a negative film or positive film 22 can be set in position without curling it.

The manner how the image input device is set in a non-use state will be described.

For the non-use purpose, the illumination unit 6 is first rotated in the direction indicated by the arrow i to the position where the lamp case 6a comes in contact with the original pedestal 5. Next, the illumination unit 7 is rotated in the direction indicated by the arrow i to the position where the support shaft 7d of the illumination unit 7, abuts the support shaft 6d of the illumination unit 6. Then, operating the button "A" 12, the camera unit 2 is rotated to a non-use position.

Next, operating the button "B" 13, the upper frame 3 is rotated further, from the close-up position, in the direction indicated by the arrow c up to the non-use position.

Lastly, operating the button "C" 14, the lower the original pedestal 5.

In the non-use state, the image input device is made compact and easy to be transported, as shown in FIG. 5.

In order to avoid improper handling, the button "C" 14 is arranged so as not to be operated until the upper frame 3 is rotated to the non-use position.

Furthermore, each articulation is adapted to become slightly resistant to the rotation to the non-use position so as to avoid abrupt rotation down to the non-use position.

Still further, the camera unit 2 is arranged not to be in contact with the original pedestal even if the image input device is folded as shown in FIG. 5.

A second embodiment of the image input device of the present invention will be described with reference to FIGS. 6 to 9.

Figure 6:
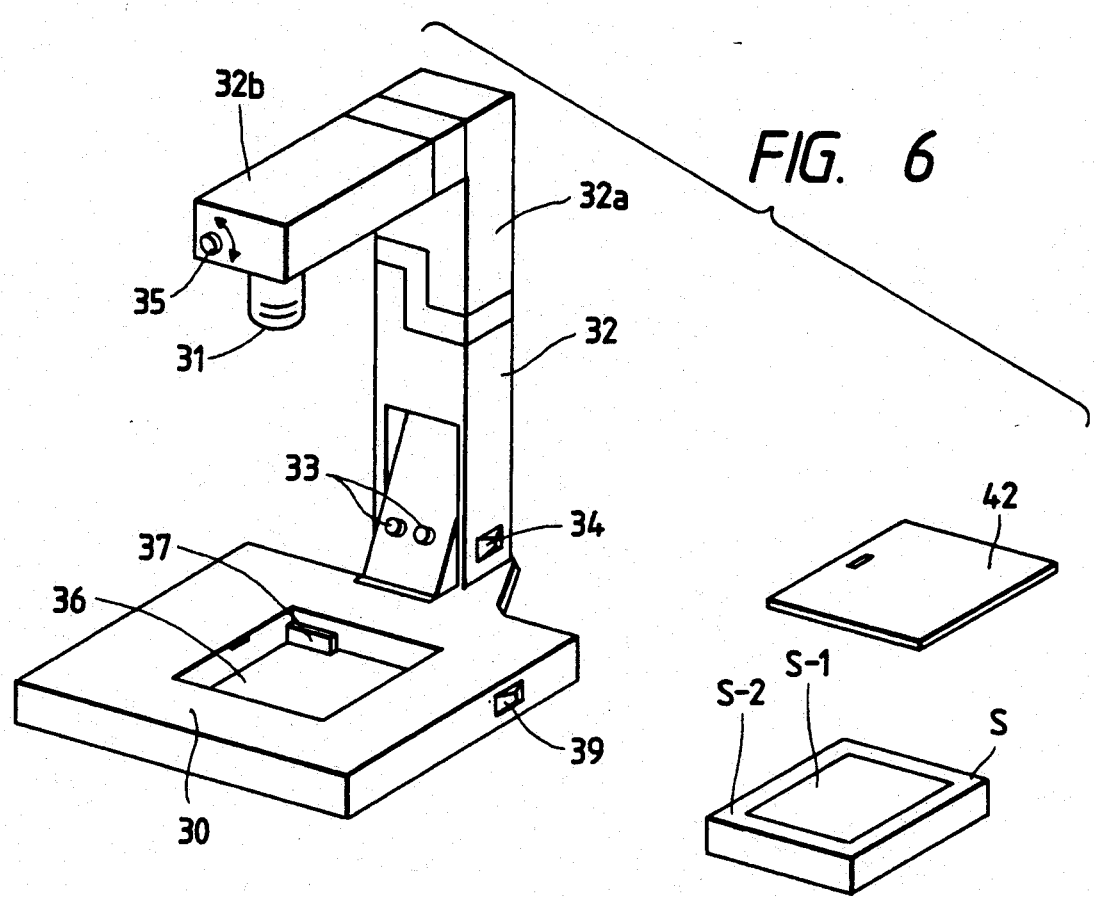
FIG. 6 is a perspective view of an image input device according to a second embodiment.
Figure 7:
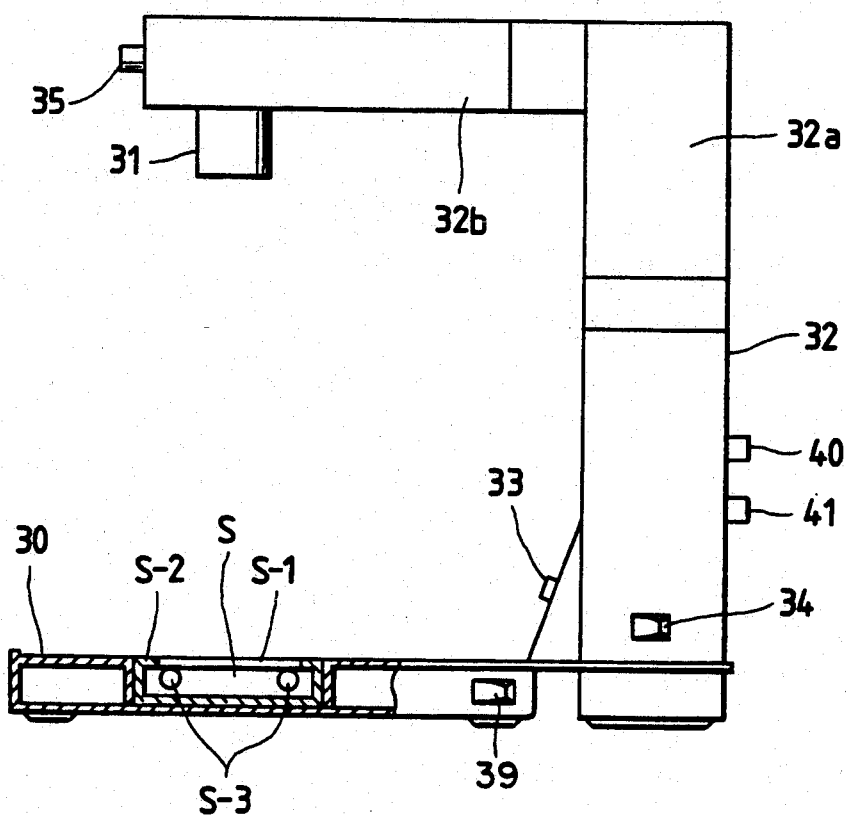
FIG. 7 is a side view of the image input device shown in FIG. 6 with the main part of it being shown as a sectional view.
Figure 8:
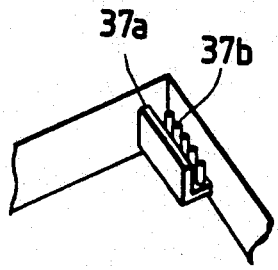
FIG. 8 is a perspective view of a transmission illumination unit plug of the image input device shown in FIG. 6.
Figure 9:
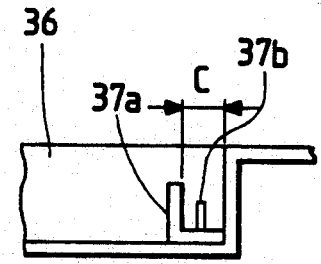
FIG. 9 is a side view of the power source plug shown in FIG. 8.
Figure 10:
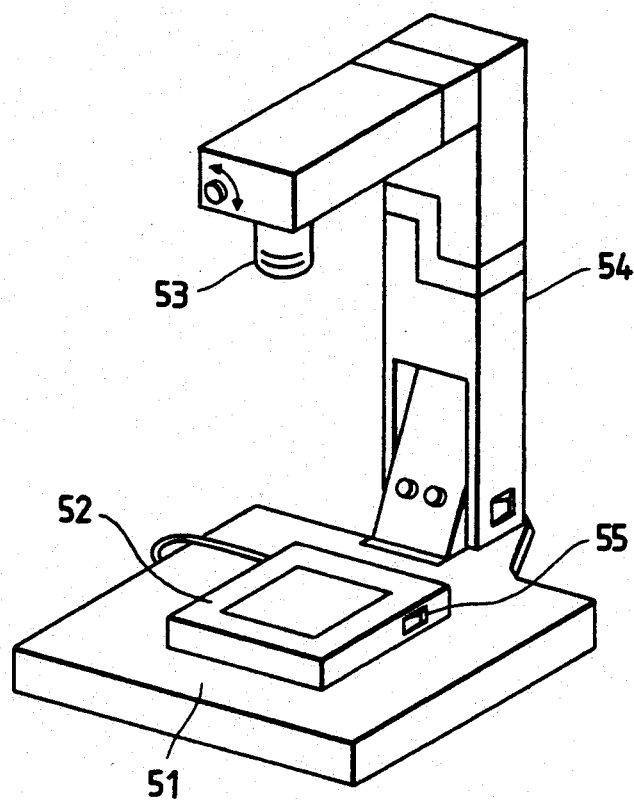
FIG. 10 is a perspective view of a conventional image input device when taking an image of a transmission original.

FIG. 6 is a perspective view of an image input device according to the second embodiment, FIG. 7 is a side view of the image input device shown in FIG. 6 with the main part of it being shown as a sectional view, FIG. 8 is a perspective view of transmission illumination unit power source plug of the image input device shown in FIG. 6, and FIG. 9 is a side view of FIG. 8.

Referring to FIGS. 6 and 7, reference numeral 30 represents an original pedestal on which an original is placed, reference numeral 31 represents a camera unit (image pickup unit) having a photoelectric conversion unit for reading an original, and reference numeral 32 represents a support frame for supporting the camera unit 31. The support frame 32 constitutes a vertical support frame 32a and a horizontal support frame 32b.

The upper surface of the original pedestal 30 is achromatic gray. The color of the upper surface of the original pedestal 30 may be white. However, gray having low reflectance is more preferable because the white surface may sometimes cause a saturated light amount received by the photoelectric conversion unit (not shown) of the camera unit 31, resulting in a disability of properly regulating white balance.

Reference numeral 33 represents switches of a switching circuit (not shown) for switching operation modes, reference numeral 34 represents a power switch, and reference numeral 35 represents a switch for adjusting white balance of the camera unit 31. The white balance is automatically adjusted by turning on the switch 35, or may be manually adjusted in accordance with the kind of external light, including light from a fluorescent lamp, light from the sun, and light from a candescent lamp.

Reference numeral 36 represents a recess formed in the original pedestal 30, a transmission illumination unit S being mounted within the recess 36, while maintaining the upper surface of the transmission illumination unit flush with the upper surface of the original pedestal 30 and maintaining the optical axis of the camera unit 31 aligned with the center of the transmission illumination unit S.

The recess 36 is formed in such a shape that the transmission illumination unit S can be mounted on and dismounted from the recess.

Reference numeral 37 represents a plug mounted within the recess 36 through which power is supplied to the transmission illumination unit S. The plug is electrically connected to a receptacle (not shown) mounted at the back of the transmission illumination unit S.

The plug 37 is constructed of a protective plate 37a and male terminals 37b, as shown in FIGS. 8 and 9. The protective plate 37a is provided to avoid electric shock when a user connects the transmission illumination unit S to the image input device. The depth between the protective plate 37a and the inner wall of the recess 36 is set such that a finger will not enter therebetween and contact the male terminals 37b.

Reference numeral 39 represents a switch which is turned on to supply power to the transmission illumination unit S, reference numeral 40 represents an input terminal for receiving an external video signal, and reference numeral 41 represents a monitor output terminal. A video signal inputted at the input terminal 40 may be taken out from the monitor output terminal.

The transmission illumination unit S will be described in detail with reference to FIGS. 6 and 7. The transmission illumination unit S is used for illuminating in a transmission manner a diffusion reflection plate S-1 of opal color mounted on a housing S-2, the diffusion reflection plate S-1 being used as an original pedestal. Within the transmission illumination unit S, there is provided illumination lamps (fluorescent lamps) S-3.

The opal color of the diffusion reflection plate S-1 may be changed to a white color. However, the opal color is more preferable because the white color may sometimes cause a saturated light amount received by the photoelectric conversion unit (not shown) of the camera unit 31, resulting in a disability of properly regulating white balance. The diffusion reflection plate S-1 uniformly diffuses light from the illumination lamps S-3 of the transmission illumination unit S, without generating irregular reflection.

Next, the operation of reading an image of an original by using the image input device constructed in the above manner, will be described.

First, for taking an image of a non-transmission original such as a copied original, the recess 36 of the original pedestal 30 is covered with a lid 42. The upper surface of the lid 42 is arranged to be flush with the upper surface of the original pedestal 30. An image of a non-transmission original such as a copied original can be taken in a similar manner as that of a conventional image input device.

Specifically, the power switch 34 is turned on to allow the camera unit 31 to take an image. An original placed on the original pedestal 30 is read with the camera unit 31. The image of the original taken with the camera unit 31 is then displayed on a monitor (not shown) connected to the image input device.

Next, for taking an image of a transmission original such a negative film, positive film, or the like, the lid 42 is removed from the original pedestal 30, and the transmission illumination unit S is set in the recess 36. Power is supplied to the transmission illumination unit S via the male terminals 37b of the plug 37. Power to the unit S is controlled to turn on and off by using the illumination switch 39.

In the above embodiment, the switch 39 of the transmission illumination unit S is mounted on the side face of the original pedestal 30. The switch 39 may be mounted directly on the transmission illumination unit S. Furthermore, the transmission illumination unit S is driven by AC power supplied from the male terminals 37b. It may be driven by DC power supplied from a built-in battery.

As described so far, according to the present invention, a transmission illumination unit is not placed on an original pedestal in the conventional manner, for taking an image of a transmission original. Therefore, scratches and stains on the original pedestal will not be generated, while maintaining good ornamental design of the pedestal.

It is not necessary to prepare a power source for a transmission illumination unit, separately from the power source of the image input device, thereby providing a simple structure of the device.

The light source for illuminating a non-transmission original can be used as a light source for illuminating a transmission original in the case of the image input device of the first embodiment. Therefore, it is not necessary to prepare a transmission illumination unit for taking an image of a transmission original, thereby solving the problems associated with device cost and maintenance.

It is to be understood that the invention may be practiced in various forms, without departing from the spirit and principal scope of the invention. It is therefore to be understood that the above embodiments are illustrative purposes only, and should not be construed as of limitation. The scope of the present invention, therefore, is to be determined solely by the following claims, and not limited by the description employed in the specification. Furthermore, modifications and changes of the scope of the following claims, which will fall within the equivalents of the claims, should be construed as within the scope of the present invention.

We claim:

1. An image input device with a pair of light sources for illuminating an original pedestal, wherein each of said light sources is adapted to be movable relative to said original pedestal and can be positioned at a first position where the light source is used as a reflection illumination light source and a second position where the light source is used as a transmission light source, wherein positions of the light sources relative to said pedestal are opposite to each other at said first position and said second position.

2. An image input device according to claim 1, further comprising a transmission illumination type original pedestal, wherein each said light source includes a fixing member for supporting said transmission illumination type original pedestal.

3. An image input device with a light source for illuminating an original pedestal, wherein said light source is adapted to be movable relative to said original pedestal and can be positioned at a first position where said light source is used as a reflection illumination light source and a second position where said light source is used as a transmission light source, a transmission illumination type original pedestal, and a housing for housing said transmission illumination type original pedestal.

4. An image input device according to claim 2, wherein said transmission illumination type original pedestal is a diffusion reflection plate for uniformly transmitting light.

5. An image input device comprising:
a) an original pedestal for mounting an original to be imaged;
b) a camera unit for taking an image of said original;
c) camera supporting means for supporting said camera unit at a predetermined position relative to said original pedestal;
d) light source means for illuminating said original; and
e) light source supporting means capable of supporting said light source means such that said light source means can be positioned at a first position where said light source means is positioned under said original pedestal and a second position where said light source is positioned above said original pedestal, wherein said light source engages with said pedestal so that said light source can be arranged at a desired position relative to said pedestal.

6. An image input device according to claim 5, wherein said original pedestal is a diffusion reflection plate capable of uniformly transmitting light.

7. An image input device comprising:
a) an original pedestal for mounting an original to be imaged;
b) image taking means for taking an image of said original; and
c) light source means capable of being used both as a transmission illumination light source and as a reflection illumination light source, wherein said light source means functions as a part of said original pedestal.

8. An image input device according to claim 7, further comprising supporting means for supporting said light source means such that said light source means can be positioned at a first position for said reflection illumination light source and a second position for said transmission illumination light source.

9. An image input device according to claim 7 further comprising a transmission type original pedestal.

10. An image input device according to claim 9, wherein said light source is fixedly positioned near said original pedestal without being in contact with said original pedestal at said second position.

11. An image input device comprising:
a) an original pedestal for mounting an original to be imaged;
b) image taking means for taking an image of said original;
c) light source means capable of being used both as a transmission illumination light source and as a reflection illumination light source; and
d) a transmission type original pedestal, said light source having a fixing member for fixing said transmission type original pedestal.

12. An image input device comprising:
a) an original pedestal for mounting an original to be imaged;
b) image taking means for taking an image of said original;

c) light source means capable of being used both as a transmission illumination light source and as a reflection illumination light source;
d) a transmission type original pedestal; and
e) a housing unit for housing said transmission type original pedestal.

13. An image input device according to claim 9, wherein said transmission type original pedestal is a diffusion reflection plate for uniformly transmitting light.

14. An image input device comprising:
a) an original pedestal for mounting an original to be imaged;
b) a camera unit for taking an image of said original;
c) a support unit for supporting said camera unit at a predetermined position; and
d) a housing unit for detachably housing a transmission illumination unit in said original pedestal.

15. An image input device according to claim 14, wherein the upper surface of said original pedestal becomes flush with the upper surface of said transmission illumination unit when said transmission illumination unit is housed within said housing unit.

16. An image input device according to claim 14, wherein a power source terminal of said transmission illumination unit is mounted within said housing unit.

17. An image input device according to claim 14, wherein there is provided a lid for covering said housing unit when said transmission illumination unit is not used, and said cover covers said housing unit to allow said camera unit to take an image of said original.

18. An image input device according to claim 14, wherein said transmission illumination unit includes a transmission original pedestal and an illumination device fixed to said transmission original pedestal.

* * * * *

UNITED STATES PATENT AND TRADEMARK OFFICE
CERTIFICATE OF CORRECTION

PATENT NO. : 5,247,330
DATED : September 21, 1993
INVENTOR(S) : Atsushi Ohyama; Koichi Tanno It is certified that error appears in the above-indentified patent and that said Letters Patent is hereby corrected as shown below:

Col. 3, line 3, delete "and" and after "frame," (second occurrence) insert -- and --

Col. 5, line 2.   Delete "we"
Col. 5, line 5.   Change "how" to -- in which --
Col. 5, line 20.  After "lower" insert -- frame 4 is rotated up to the non-use position and to --
Col. 7, line 39.  After "are" insert -- for --
Col. 10, line 2.  Change "the" to -- an --
Col. 10, line 3.  Change "the" to -- an --
Col. 10, line 12. Change "cover covers" to -- lid covers --
Col. 10, line 13. Change "an" to -- said --

Signed and Sealed this

Twelfth Day of April, 1994

Attest:

BRUCE LEHMAN

Attesting Officer   Commissioner of Patents and Trademarks